US012646430B2

(12) United States Patent
Baumgartl et al.

(10) Patent No.: US 12,646,430 B2
(45) Date of Patent: Jun. 2, 2026

(54) DISPLAY DEVICE FOR DISPLAYING AT LEAST ONE IMAGE, AND VEHICLE COMPRISING THE DISPLAY DEVICE

(71) Applicant: Bayerische Motoren Werke Aktiengesellschaft, Munich (DE)

(72) Inventors: Martin Baumgartl, Grafing (DE); Armin Wagner-Gentner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/882,931

(22) Filed: Sep. 12, 2024

(65) Prior Publication Data

US 2025/0124831 A1 Apr. 17, 2025

(30) Foreign Application Priority Data

Oct. 13, 2023 (DE) ..................... 10 2023 128 017.1

(51) Int. Cl.
| | |
|---|---|
| *G09G 3/00* | (2006.01) |
| *G02B 30/26* | (2020.01) |
| *G09G 3/20* | (2006.01) |
| *H04N 13/351* | (2018.01) |

(52) U.S. Cl.
CPC ............. *G09G 3/001* (2013.01); *G02B 30/26* (2020.01); *G09G 3/2007* (2013.01); *H04N 13/351* (2018.05); *G09G 2320/066* (2013.01); *G09G 2320/068* (2013.01); *G09G 2340/12* (2013.01); *G09G 2358/00* (2013.01); *G09G 2380/10* (2013.01)

(58) Field of Classification Search
CPC ...... G02B 30/26; G09G 3/001; G09G 3/2007; G09G 2320/066; G09G 2320/068; G09G 2340/12; G09G 2358/00; G09G 2380/10; H04N 13/351
See application file for complete search history.

(56) References Cited

U.S. PATENT DOCUMENTS

2007/0296874 A1* 12/2007 Yoshimoto ........... G09G 3/3648
348/739

FOREIGN PATENT DOCUMENTS

| DE | 10 2022 202 502 A1 | 9/2023 |
|---|---|---|
| EP | 1 804 232 A1 | 7/2007 |

OTHER PUBLICATIONS

German-language Search Report issued in German Application No. 10 2023 128 017.1 dated Jul. 18, 2024 with partial English translation (12 pages).

* cited by examiner

*Primary Examiner* — Cory A Almeida
(74) *Attorney, Agent, or Firm* — Crowell & Moring LLP

(57) ABSTRACT

A display device for displaying at least one image includes a receiver device configured to receive image data assigned to the at least one image, an electronic visual display having a plurality of pixels, configured to display the at least one image by emitting light from the plurality of pixels, a control device configured to control the electronic visual display based on the image data to emit light in a first angular range in order to display a first image on the electronic visual display, the first image being registrable in a first observation angular range with respect to the electronic visual display that corresponds to the first angular range.

11 Claims, 3 Drawing Sheets

DISPLAY DEVICE FOR DISPLAYING AT LEAST ONE IMAGE, AND VEHICLE COMPRISING THE DISPLAY DEVICE

CROSS REFERENCE TO RELATED APPLICATION

This application claims priority under 35 U.S.C. § 119 from German Patent Application No. DE 10 2023 128 017.1, filed Oct. 13, 2023, the entire disclosure of which is herein expressly incorporated by reference.

BACKGROUND AND SUMMARY

The present invention relates to a display device for displaying at least one image, and to a vehicle comprising the display device.

There are applications for display devices in which other viewers alongside the user of the display device are to be allowed or not allowed to view the display or the (moving) image displayed by an electronic visual display of the display device.

One example of display devices designed thus includes a so-called front passenger screen or so-called front passenger display in a vehicle, in which the driver should be able to see the images or content displayed on the electronic visual display of the display device, for example if static traffic information is displayed, or should not be able to see said images or content, for example if a movie is displayed for the front passenger.

Such technology used in the aforementioned display devices is also known by the keyword "switchable privacy" and denotes the switchover between a "public mode" and a "privacy mode".

The switchover here is typically between a state with directed, in particular substantially perpendicular, light emission from the electronic visual display in the direction of a main user in the privacy mode and broad light emission by the electronic visual display in the public mode, in which the content displayed on the electronic visual display is also visible or registrable from the side.

However, a suppression quality with regards to visibility from the side in the privacy mode of such known display devices frequently does not suffice to, for example, reliably prevent the driver of a vehicle from being distracted by the (lateral) viewability and registrability of the display and, respectively, the displayed (moving) image, for example a movie, on the front passenger display device.

Since human perception is very sensitive to moving images on a dark background in particular, the degrees of suppression in the privacy mode provided by most technologies are insufficient to reliably prevent the driver from being distracted.

Moreover, display devices are known, which are configured to provide, in addition or as an alternative to the "switchable privacy" technology, a "dual view technology", in which two different (moving) images registrable from mutually different (image) observation angular ranges are displayed simultaneously on an electronic visual display.

It is an object of the present invention to provide an improved display device for displaying at least one image.

This object is achieved by the features of the claimed invention.

According to a first aspect of the present invention, a display device for displaying at least one image comprises according to one embodiment:

a receiver device configured to receive image data assigned to the at least one image, an electronic visual display having a plurality of pixels, configured to display the at least one image by emitting light from the plurality of pixels, a control device configured to control the electronic visual display on the basis of the image data so as to emit light in a first angular range, which is horizontal in some embodiments, in order to display a first image on the electronic visual display, the first image being registrable in a first observation angular range, which is horizontal in some embodiments, with respect to the electronic visual display, with respect to an (emission) surface of the electronic visual display in some embodiments, that corresponds to the first angular range, wherein the control device is configured to set, on the basis of the image data, a respective transmittance of a respective first optical element, assigned to a respective pixel of the plurality of pixels, for a respective light emitted by a respective pixel of the plurality of pixels when the first image is displayed in a second angular range, which is horizontal in some embodiments, differing from the first angular range, depending on an intensity of the light emitted in the first angular range and/or depending on a respective grayscale value assigned to the respective pixel, and/or the control device is configured to control the electronic visual display on the basis of the image data so as to emit light in a third angular range, which is horizontal in some embodiments, in order to display a third image on the electronic visual display, the third image being registrable in a third observation angular range with respect to the electronic visual display, with respect to an (emission) surface of the electronic visual display in some embodiments, that corresponds to the third angular range, wherein the image data contain first image data assigned to the first image and third image data assigned to the third image, and the control device is configured to modify the third image data on the basis of the first image data and control the electronic visual display on the basis of the modified third image data so as to emit light in the third angular range in order to display on the electronic visual display an altered third image, simultaneously with the first image.

In some embodiments, the reception device can be configured to receive from the corresponding equipment image data, stored for example in a storage device or on a DVD, playable using a DVD player, or in a cloud.

In some embodiments, the image data may comprise respective grayscale values assigned to the respective pixels. In some embodiments, the image data may also comprise one or more parameter values assigned to the respective pixels, for instance a plurality of different color values, for example a respective red value, a respective green value and a respective blue value, on the basis of which a respective gray value of a respective pixel is calculable or derivable by the control device, for example by using a suitable calculation formula.

In some embodiments, the first (image) observation angular range can comprise the range of the (horizontal) angles from −10° to 10° with respect to a normal on the (emission) surface of the electronic visual display, the second (image) observation angular range can comprise the range of the (horizontal) angles from −10° to −90° with respect to the normal, and the third (image) observation angular range can comprise the range of the (horizontal) angles from −60° to −80° with respect to the normal, wherein the first (image) observation angular range, the second (image) observation angular range and the third (image) observation angular range may lie in one plane.

The terms "comprises", "contains", "includes", "features", "has", "with", or any other variant thereof optionally used herein are intended to cover a non-exclusive inclusion. For example, a method or an apparatus comprising or having a list of elements is thus not necessarily restricted to these elements but can include other elements either not expressly listed or inherent to such a method or such an apparatus.

Further, "or" relates to an inclusive "or" and not to an exclusive "or" unless the opposite is expressly stated. For example, a condition A or B is satisfied by one of the following conditions: A is true (or present) and B is false (or not present), A is false (or not present) and B is true (or present), and both A and B are true (or present).

The terms "a" or "an", as used herein, are defined within the meaning of "one or more". The terms "another" and "a further" and any other variant thereof should be understood within the meaning of "at least one further".

The term "a plurality of", as used herein, should be understood within the meaning of "two or more".

The term "configured" or "designed" to fulfill a specific function (and respective modifications thereof), as used herein, should be understood to mean that the corresponding apparatus or device is already present in a configuration or setting in which it can carry out the function or in which it at least is adjustable—i.e. configurable—in such a way that it can carry out the function following an appropriate adjustment. For example, the configuration can in this context be implemented by way of appropriately setting parameters of a process flow or switches or the like in order to activate or deactivate functionalities or settings. In particular, the apparatus or device can have a plurality of predetermined configurations or modes of operation such that configuring can be implemented by way of a selection of one of these configurations or modes of operation.

In this case, the display device can be configured to implement the switchable privacy technology, wherein a second observation angular range corresponding to the second angular range corresponds to an observation angular range in which the lateral view or visibility or registrability of the first image displayed on the electronic visual display should be suppressed from the side in a privacy mode. Furthermore, in this case, the display device, the control device in some embodiments, can be configured to set, in a public mode of the switchable privacy technology, a respective transmittance of the first optical elements such that the first image is registrable by a user from both the first observation angular range and the second observation angular range.

In some embodiments, in which the control device is configured to set, on the basis of the image data, a respective transmittance of a respective first optical element, assigned to a respective pixel of the plurality of pixels, for a respective light emitted by a respective pixel of the plurality of pixels when the first image is displayed in a second angular range, which is horizontal in some embodiments, differing from the first angular range, depending on an intensity of the light emitted in the first angular range and/or depending on a respective grayscale value assigned to the respective pixel, this allows, by way of suitably setting the respective transmittance of a respective first optical element, active, pixel-by-pixel control of the side view in the privacy mode such that information contained in the first image is not registrable or cannot be perceived in the second observation angular range.

Furthermore, in some embodiments, in which the control device is configured to control the electronic visual display on the basis of the image data so as to emit light in a third, in particular horizontal, angular range, in order to display a third image on the electronic visual display, the third image being registrable in a third observation angular range with respect to the electronic visual display that corresponds to the third angular range, wherein the image data contain first image data assigned to the first image and third image data assigned to the third image, and the control device is configured to modify the third image data on the basis of the first image data and control the electronic visual display on the basis of the modified third image data so as to emit light in the third angular range in order to display on the electronic visual display an altered third image, simultaneously with the first image, this renders it possible, by way of a suitable modification of the third image data to form the modified third image data, to achieve the situation in which parasitic crosstalk content of the third image is compensated for by way of the altered third image for a user situated in the third observation angular range.

Preferred embodiments of the invention and their developments are described below; these can in each case be combined with one another as desired unless this is explicitly precluded.

In some embodiments, a respective pixel is assigned a respective grayscale value in the image data, wherein the control device is configured to set a respective transmittance of a respective first optical element, assigned to a respective pixel of the plurality of pixels, for the respective light emitted by the respective pixel of the plurality of pixels for displaying the first image in the second angular range differing from the first angular range, depending on the grayscale value of the respective pixel in such a way that the transmittance of a first optical element which is assigned to a pixel assigned a maximum grayscale value is set to a minimal transmittance.

In some embodiments, the control device is configured to set, on the basis of the image data, the respective transmittance of the respective first optical element, assigned to the respective pixel of the plurality of pixels, for the respective light emitted by the respective pixel of the plurality of pixels when the first image is displayed in the second angular range differing from the first angular range, depending on the grayscale value assigned to the respective pixel in such a way that the respective transmittances of the respective first optical elements, assigned to the respective pixel of the plurality of pixels, for the respective light emitted by the respective pixel of the plurality of pixels when the first image is displayed in the second angular range differing from the first angular range are reciprocals of the respective grayscale values, normalized to 1, of the corresponding pixels.

This can increase a brightness of a second image perceivable by a user situated in a second observation angular range that corresponds to the second angular range in some embodiments, but information content contained in the first image can no longer be registered by the user.

In this case, the control device can be configured in the case of a moving first image to perform a calculation of the transmittances at the frame rate, whereby even fast changes in the first image are not visible or registrable by a user in the second viewing angle range.

In some embodiments, the control device is configured to set, on the basis of the image data, the respective transmittance of the respective first optical element, assigned to the respective pixel of the plurality of pixels, for the respective light emitted by the respective pixel of the plurality of pixels when the first image is displayed in the second angular range differing from the first angular range, said setting depending on the intensity of the light emitted by the respective pixel in the first angular range and being performed in such a way that a contrast of a second image registrable in a second observation angular range, which is a horizontal observation angular range in some embodiments, with respect to the electronic visual display that corresponds to the second angular range is minimized.

In some embodiments, the display device further comprises a second optical element configured to cause at least a portion of a light emitted by a first subset of the plurality of pixels to be emitted in the first angular range in order to display the first image on the electronic visual display, to cause at least a portion of a light emitted by a second subset of the plurality of pixels to be emitted in the third angular range in order to display the third image on the electronic visual display and to cause at least one other portion of the light emitted by the first subset of the plurality of pixels to be emitted in the third angular range, wherein the control device is configured to modify the third image data, in some embodiments a respective grayscale value assigned to a respective pixel of the second subset of the plurality of pixels, on the basis of the first image data such that the at least one portion of the light emitted by the second subset of the plurality of pixels in the third angular range is altered.

In some embodiments, the control device is configured to modify the third image data to form the modified third image data in such a way that a contrast of an image formed by the emission of the light of the at least one other portion of the first subset of the plurality of pixels is minimized or at least reduced by an overlay with the altered third image in the image formed by the overlay.

In some embodiments, the control device is configured to modify the third image data to form the modified third image data in such a way that an image formed by an overlay of the image formed by the emission of the light of the at least one other portion of the first subset of the plurality of pixels and the altered third image corresponds, at least substantially, to an image formed by an overlay of the third image and a gray image.

What can advantageously be achieved as a result in some embodiments is that the image formed by the overlay of the image formed by the emission of the light of the at least one other portion of the first subset of the plurality of pixels and the altered third image is displayed relatively darkly.

In some embodiments, the first optical element comprises an electrically switchable diffuser and/or an electrically switchable dye-doped liquid crystal polarizer and/or the second optical element comprises a parallax barrier and/or a microlens array.

According to a second aspect of the present invention, a vehicle comprises an above-described display device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
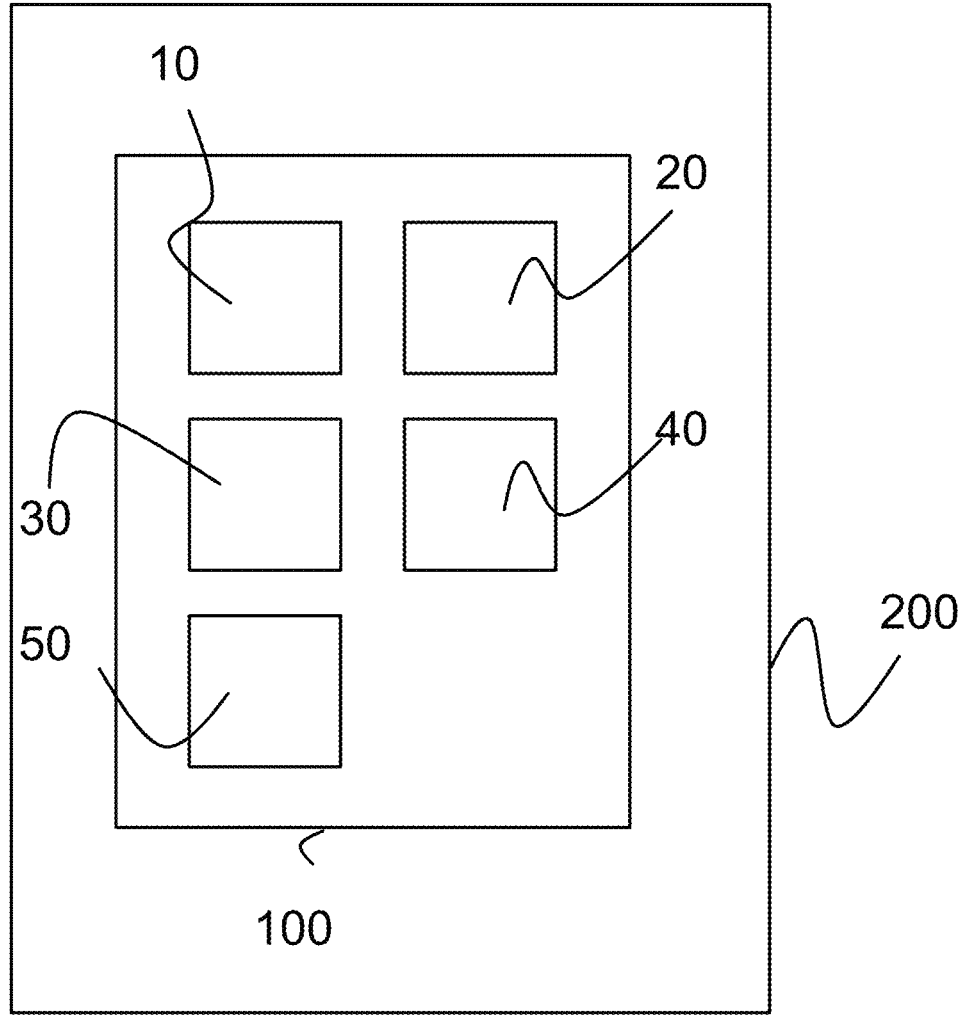
FIG. 1 shows a display device for displaying at least one image according to an embodiment.
Figure 2:
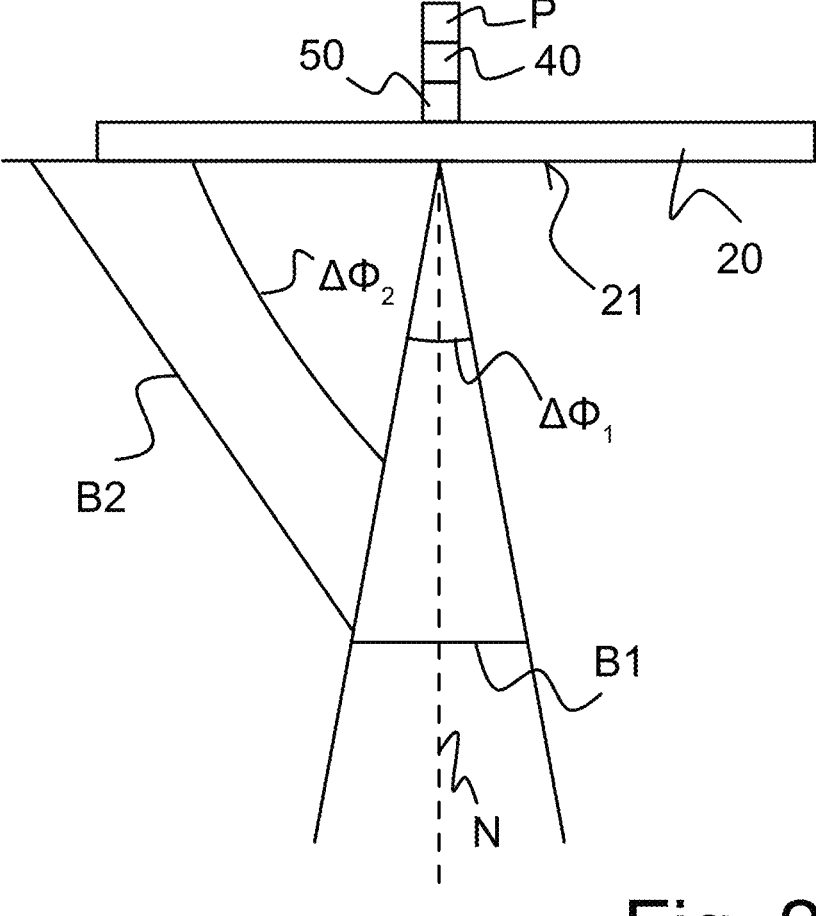
FIG. 2 shows an illustration serving to explain a first mode of operation of the display device.
Figure 3:
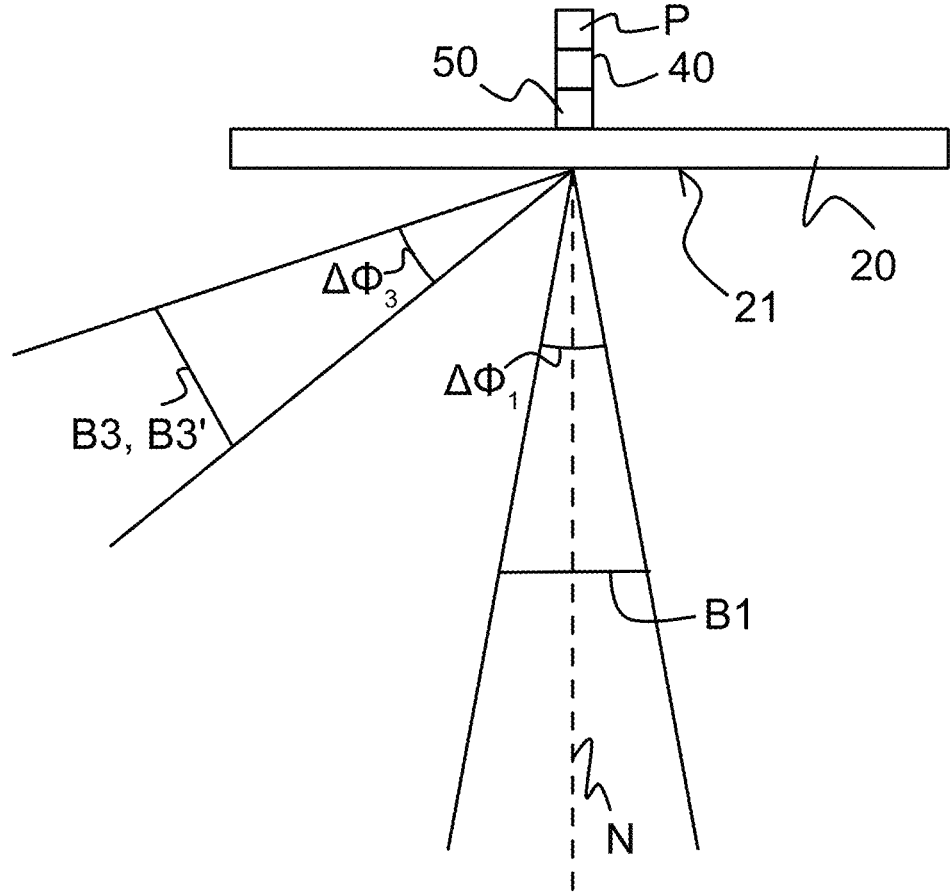
FIG. 3 shows an illustration serving to explain a second mode of operation of the display device.

FIG. 1 shows a display device for displaying at least one image according to an embodiment, FIG. 2 shows an illustration serving to explain a first mode of operation of the display device, and FIG. 3 shows an illustration serving to explain a second mode of operation of the display device.

The display device 100, which for example is or can be installed in a vehicle 200, comprises a receiver device 10, which is configured to receive image data assigned to the at least one image B1, B2, B3 and stored for example in a storage device (not shown) or on a DVD, which is playable using a DVD player (not shown), or in a cloud.

The display device 100 further comprises an electronic visual display 20 having a plurality of pixels P, of which only one is shown in FIGS. 2 and 3 for reasons of simplicity, the electronic visual display being configured to display the at least one image B1, B2, B3 by emitting light from the plurality of pixels P.

In FIGS. 2 and 3, the respective images B1, B2, B3, which are displayed or shown directly on the electronic visual display 20, are for reasons of simplicity or for reasons of clarity displayed schematically at a distance from the electronic visual display 20 and in conjunction with a respective assigned (image) observation angular range $\Delta\Phi_1$, $\Delta\Phi_2$, $\Delta\Phi_3$, which is located in a plane and within which the respective images B1, B2, B3 are visible or registrable. In this case, the (image) observation angular ranges $\Delta\Phi_1$, $\Delta\Phi_2$, $\Delta\Phi_3$ are in particular (image) observation angular ranges located in the same plane, for example horizontal (image) observation angular ranges located in a horizontal plane, which can be specified in relation to a normal N of an (emission) surface 21 of the electronic visual display 20.

For example, in this case, the (image) observation angular range $\Delta\Phi_1$ can comprise the range of the (horizontal) angles from $-10°$ to $10°$ with respect to the normal N, the (image) observation angular range $\Delta\Phi_2$ can comprise the range of the (horizontal) angles from $-10°$ to $-90°$ with respect to normal N, and the (image) observation angular range $\Delta\Phi_3$ can comprise the range of the (horizontal) angles from $-60°$ to $-80°$ with respect to the normal N.

In some embodiments, the image data may comprise respective grayscale values assigned to the respective pixels P. In some embodiments, the image data may also comprise one or more parameter values assigned to the respective pixels P, for instance a plurality of different color values, for example a respective red value, a respective green value and a respective blue value, on the basis of which a respective gray value of a respective pixel P is calculable or derivable, for example by using a suitable calculation formula.

Moreover, the display device 100 comprises a control device 30 configured to control the electronic visual display 20 on the basis of the image data so as to emit light in a first angular range $\Delta\Phi_1$, which is horizontal in some embodiments, in order to display a first image B1 on the electronic visual display 20, the first image being registrable in a first observation angular range, which is horizontal in some embodiments, with respect to the electronic visual display 20, with respect to a (plane) surface 21 of the electronic visual display 20 in some embodiments, that corresponds to the first angular range $\Delta\Phi_1$.

The display device 100 also comprises a plurality of first optical elements 40 and/or a second optical element 50 or a plurality of second optical elements 50, of which only a respective one has been depicted in FIGS. 2 and 3 for reasons of simplicity. For example, the first optical element 40 can comprise an electrically switchable diffuser and/or an electrically switchable dye-doped liquid crystal polarizer. The second optical element 50 can comprise a parallax barrier and/or a microlens array.

In a first mode of operation, in some embodiments within the scope of switchable privacy technology of the display device 100, the control device 30 with respect to FIG. 2 is configured to set, on the basis of the image data, a respective transmittance of a respective first optical element 40, assigned to a respective pixel P of the plurality of pixels P, for a respective light emitted by a respective pixel P of the plurality of pixels P when the first image B1 is displayed in a second angular range $\Delta\Phi_2$, which is horizontal in some embodiments, differing from the first angular range $\Delta\Phi_1$, depending on an intensity of the light emitted in the first angular range $\Delta\Phi_1$ and/or depending on a respective grayscale value assigned to the respective pixel.

In this case, the control device 30 can be configured to set a respective transmittance of a respective first optical element 40, assigned to a respective pixel P of the plurality of pixels P, for the respective light emitted by the respective pixel P of the plurality of pixels P for displaying the first image B1 in the second angular range $\Delta\Phi_2$ differing from the first angular range $\Delta\Phi_1$, depending on the grayscale value of the respective pixel P in such a way that the transmittance of a first optical element 40 which is assigned to a pixel P assigned a maximum grayscale value is set to a minimal transmittance.

In an alternative, the control device 30 can be configured to set, on the basis of the image data, the respective transmittance of the respective first optical element 40, assigned to the respective pixel P of the plurality of pixels P, for the respective light emitted by the respective pixel P of the plurality of pixels P for displaying the first image B1 in the second angular range $\Delta\Phi_2$ differing from the first angular range $\Delta\Phi_1$, depending on the grayscale value assigned to the respective pixel P in such a way that the respective transmittances of the respective first optical elements 40, assigned to the respective pixel P of the plurality of pixels P, for the respective light emitted by the respective pixel P of the plurality of pixels P for displaying the first image B1 in the second angular range $\Delta\Phi_2$ differing from the first angular range $\Delta\Phi_1$ are reciprocals of the respective grayscale values, normalized to 1, of the corresponding pixels P.

In addition or in an alternative, the control device 30 can also be configured to set, on the basis of the image data, the respective transmittance of the respective first optical element 40, assigned to the respective pixel P of the plurality of pixels P, for the respective light emitted by the respective pixel P of the plurality of pixels P for displaying the first image B1 in the second angular range $\Delta\Phi_2$ differing from the first angular range $\Delta\Phi_1$, depending on the intensity of the light emitted by the respective pixel P in the first angular range $\Delta\Phi_1$ in such a way that a contrast of a second image B2 registrable in a second observation angular range, which is horizontal in some embodiments, with respect to the electronic visual display 20 that corresponds to the second angular range $\Delta\Phi_2$ is minimized.

In a second mode of operation of the display device 100, in some embodiments within the scope of a "dual view" technology, in which two different images registrable from different (image) observation angular ranges can be displayed or shown simultaneously by the display device 100, the control device 30 with respect to FIG. 3 is configured to control the electronic visual display 20 on the basis of the image data so as to emit light in a third angular range $\Delta\Phi_3$, which is horizontal in some embodiments, in order to display a third image B3 on the electronic visual display 20, the third image being registrable in a third observation angular range with respect to the electronic visual display 20 that corresponds to the third angular range $\Delta\Phi_3$, wherein the image data contain first image data assigned to the first image B1 and third image data assigned to the third image B3, and the control device 30 is configured to modify the third image data on the basis of the first image data and control the electronic visual display 20 on the basis of the modified third image data so as to emit light in the third angular range $\Delta\Phi_3$ in order to display on the electronic visual display 20 an altered third image B3', simultaneously with the first image B1.

The second optical element 50 is configured to cause at least a portion of a light emitted by a first subset of the plurality of pixels P to be emitted in the first angular range $\Delta\Phi_1$ in order to display the first image B1 on the electronic visual display 20, to cause at least a portion of a light emitted by a second subset of the plurality of pixels P to be emitted in the third angular range $\Delta\Phi_3$ in order to display the third image B3 on the electronic visual display 20, and to cause at least one other portion of the light emitted by the first subset of the plurality of pixels to be emitted in the third angular range $\Delta\Phi_3$, wherein the control device 30 is configured to modify the third image data, in some embodiments a respective grayscale value assigned to a respective pixel P of the second subset of the plurality of pixels P, on the basis of the first image data such that the at least one portion of the light emitted by the second subset of the plurality of pixels P in the third angular range $\Delta\Phi_3$ is altered.

In this case, the control device 30 can be configured to modify the third image data to form the modified third image data in such a way that a contrast of an image formed by the emission of the light of the at least one other portion of the first subset of the plurality of pixels P is minimized or at least reduced by an overlay with the altered third image B3' in the image formed by the overlay.

In this case, the control device 30 can be further configured to modify the third image data to form the modified third image data in such a way that an image formed by an overlay of the image formed by the emission of the light of the at least one other portion of the first subset of the plurality of pixels P and the altered third image B3' corresponds, at least substantially, to an image formed by an overlay of the third image B3 and a gray image.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A display device for displaying at least one image, the display device comprising:

a receiver device configured to receive image data assigned to the at least one image, an electronic visual display having a plurality of pixels, wherein the electronic visual display is configured to display the at least one image by emitting light from the plurality of pixels, a control device configured to control the electronic visual display based on the image data to emit light in a first horizontal angular range, in order to display a first image on the electronic visual display, the first image being registrable in a first horizontal observation angular range with respect to the electronic visual display that corresponds to the first angular range, wherein:

the control device is configured to set, based on the image data, a respective transmittance of a respective first optical element, assigned to a respective pixel of the plurality of pixels, for a respective light emitted by the respective pixel of the plurality of pixels when the first image is displayed in a second horizontal angular range differing from the first angular range depending on an intensity of the light emitted by the respective pixel in the first angular range and a respective grayscale value assigned to the respective pixel, and the control device is configured to control the electronic visual display based on the image data to emit light in a third horizontal angular range, in order to display a third image on the electronic visual display, the third image being registrable in a third observation angular range with respect to the electronic visual display that corresponds to the third angular range, wherein the image data contain first image data assigned to the first image and third image data assigned to the third image, and the control device is configured to modify the third image data based on the first image data and control the electronic visual display based on the modified third image data to emit light in the third angular range in order to display on the electronic visual display an altered third image, simultaneously with the first image.

2. The display device according to claim 1, wherein the respective pixel is assigned a respective grayscale value in the image data, and the control device is configured to set a respective transmittance of a respective first optical element, assigned to the respective pixel of the plurality of pixels, for the respective light emitted by the respective pixel of the plurality of pixels for displaying the first image in the second angular range differing from the first angular range depending on the grayscale value of the respective pixel such that the transmittance of a first optical element which is assigned to a pixel assigned a maximum grayscale value is set to a minimal transmittance.

3. The display device according to claim 1, wherein the control device is configured to set, based on the image data, the respective transmittance of the respective first optical element, assigned to the respective pixel of the plurality of pixels, for the respective light emitted by the respective pixel of the plurality of pixels for displaying the first image in the second angular range differing from the first angular range depending on the grayscale value assigned to the respective pixel such that the respective transmittances of the respective first optical elements, assigned to the respective pixel of the plurality of pixels, for the respective light emitted by the respective pixel of the plurality of pixels for displaying the first image in the second angular range differing from the first angular range are reciprocals of the respective grayscale values, normalized to 1, of the corresponding pixels.

4. The display device according to claim 1, wherein the control device is configured to set, based on the image data, the respective transmittance of the respective first optical element, assigned to the respective pixel of the plurality of pixels, for the respective light emitted by the respective pixel of the plurality of pixels for displaying the first image in the second angular range differing from the first angular range depending on the intensity of the light emitted by the respective pixel in the first angular range such that a contrast of a second image registrable in a second horizontal observation angular range with respect to the electronic visual display that corresponds to the second angular range is minimized.

5. The display device according to claim 1, further comprising a second optical element configured to cause at least a portion of a light emitted by a first subset of the plurality of pixels to be emitted in the first angular range in order to display the first image on the electronic visual display, to cause at least a portion of a light emitted by a second subset of the plurality of pixels to be emitted in the third angular range in order to display the third image on the electronic visual display, and to cause at least one other portion of the light emitted by the first subset of the plurality of pixels to be emitted in the third angular range, wherein the control device is configured to modify a respective grayscale value assigned to a respective pixel of the second subset of the plurality of pixels based on the first image data such that the at least one portion of the light emitted by the second subset of the plurality of pixels in the third angular range is altered.

6. The display device according to claim 5, wherein the control device is configured to modify the third image data to form the modified third image data such that a contrast of an image formed by the emission of the light of the at least one other portion of the first subset of the plurality of pixels is minimized or reduced by an overlay with the altered third image in the image formed by an overlay.

7. The display device according to claim 6, wherein the control device is configured to modify the third image data to form the modified third image data such that an image formed by an overlay of the image formed by the emission of the light of the at least one other portion of the first subset of the plurality of pixels and the altered third image corresponds, at least substantially, to an image formed by an overlay of the third image and a gray image.

8. The display device according to claim 5, wherein the first optical element comprises at least one of an electrically switchable diffuser or an electrically switchable dye-doped liquid crystal polarizer.

9. The display device according to claim 8, wherein the second optical element comprises at least one of a parallax barrier or a microlens array.

10. The display device according to claim 5, wherein the second optical element comprises at least one of a parallax barrier or a microlens array.

11. A vehicle comprising the display device according to claim 1.

* * * * *